United States Patent  
Ridings et al.

(10) Patent No.: US 11,737,446 B2  
(45) Date of Patent: Aug. 29, 2023

(54) SYSTEM, METHOD AND AN APPARATUS FOR SPRAYING INSECT CONTROL SUBSTANCES

(71) Applicant: Broward County, Fort Lauderdale, FL (US)

(72) Inventors: Mark Ridings, Coconut Creek, FL (US); Adriana Toro, Coconut Creek, FL (US)

(73) Assignee: Broward County, Ft. Lauderdale, FL (US)

( * ) Notice: Subject to any disclaimer, the term of this patent is extended or adjusted under 35 U.S.C. 154(b) by 460 days.

(21) Appl. No.: 16/741,950

(22) Filed: Jan. 14, 2020

(65) Prior Publication Data

US 2021/0212308 A1 Jul. 15, 2021

(51) Int. Cl.
*A01M 7/00* (2006.01)

(52) U.S. Cl.
CPC ............ *A01M 7/00* (2013.01); *A01M 7/0017* (2013.01)

(58) Field of Classification Search
CPC .............................. B05B 7/0075; B05B 3/105
See application file for complete search history.

(56) References Cited

U.S. PATENT DOCUMENTS

| | | | | |
|---|---|---|---|---|
| 5,373,990 | A * | 12/1994 | Ballu | B05B 3/022 239/77 |
| 6,152,382 | A * | 11/2000 | Pun | A01M 7/006 239/11 |
| 11,140,813 | B1 * | 10/2021 | Morrison | G06T 7/70 |
| 2001/0019082 | A1 * | 9/2001 | Nishimura | A01M 7/0014 239/164 |
| 2002/0100815 | A1 * | 8/2002 | Doebler | A01M 7/0028 239/146 |
| 2011/0139899 | A1 * | 6/2011 | Robinson, Jr. | A01M 7/0089 239/302 |
| 2012/0111961 | A1 * | 5/2012 | Arnold | A01M 7/0014 239/1 |
| 2015/0189882 | A1 * | 7/2015 | Hungenberg | A01N 63/22 514/357 |
| 2017/0080266 | A1 * | 3/2017 | Krekoukis | A62C 31/24 |
| 2018/0064091 | A1 * | 3/2018 | Clarke | A01M 7/0071 |
| 2018/0160670 | A1 * | 6/2018 | Pellenc | B05B 3/105 |
| 2018/0168140 | A1 * | 6/2018 | Pellenc | B05B 7/0081 |
| 2019/0090472 | A1 * | 3/2019 | Crinklaw | A01B 79/005 |
| 2020/0070194 | A1 * | 3/2020 | Williams | B05B 15/40 |
| 2020/0261926 | A1 * | 8/2020 | Bollenhagen | A01M 7/0014 |
| 2021/0212308 | A1 * | 7/2021 | Ridings | A01M 7/0017 |

* cited by examiner

*Primary Examiner* — Joseph A Greenlund

(74) *Attorney, Agent, or Firm* — Fowler White Burnett P.A.

(57) ABSTRACT

The invention is a portable sprayer for liquids and particulate-containing liquids, including a fluid storage module having at least one fluid tank, a fluid transport module in fluid connection with the fluid storage module, a distribution block, and a dispersion module in fluid connection with the fluid transport module, having a turbine, an adjustable nozzle connected to the turbine in fluid connection with the fluid transport module and air flow connection with the turbine. Fluid exits the dispersion module under a pressure of approximately 100 psi and the sprayer emits droplets containing particulates about 130 microns in diameter to a height of 100 feet vertically.

14 Claims, 16 Drawing Sheets

SYSTEM, METHOD AND AN APPARATUS FOR SPRAYING INSECT CONTROL SUBSTANCES

FIELD OF THE INVENTION

The present invention relates to sprayers, and more particularly to sprayers of water-based granular product such as a public health pesticide.

BACKGROUND OF THE INVENTION

Diseases may be carried by insects such as *Aedes aegypti* mosquitos. Insects such as these require little water to breed, live indoors and outdoors and may bite during the day or night. Traditional treatments by pesticides such as insecticide or larvicide are known and have shortcomings. Aerial spraying is difficult to perform because it is difficult to obtain proper approvals and permitting. Also, there is much waste of the treatment products and it is an expensive treatment.

Spraying by foot has low efficiency. Furthermore, there is usually only limited access for this type of treatment, and it, too, is expensive.

Ultra low volume (ULV) sprayers, which are mainly used for the control of adult mosquitos, have a limited reach from typical transportation vehicles used to perform the sprays, and the droplets created when this treatment is performed are too small for effective larvicide application. ULV sprays generally provide droplets of about 20 microns.

Sprayers are commonly mounted for transportation on a vehicle through a mosquito-infested region to disperse agricultural products such as insecticides or larvicides. Such sprayers atomize liquid for dispersal as a spray throughout an insect-infested region as the vehicle upon which the sprayer is mounted drives through the region. The spray may include particulates of a particular size in order to have the best result.

Several agricultural sprayers are used for liquids that do not include particulates. Product applications such as larvicides require liquids such as water including particulates of larvicide. Widespread application of water containing particulates requires droplet size within a range for effective deposition. In addition, the droplets must be delivered at a velocity to achieve a sufficient height that would make the application efficient. Thus, a reduced amount of larvicide may be used via an effective deposition technique.

The present invention creates an enhanced vacuum effect and assists with pushing the larvicide out and away from the airflow tube.

The present invention reduces turbulence in the water containing particulates and reduces product waste.

SUMMARY OF THE INVENTION

The invention provides, in one aspect, a sprayer for liquids and particulate-containing liquids, including a fluid storage module having at least one fluid tank; a fluid transport module in fluid connection with the fluid storage module, including a distribution block, and a fluid dispersion module in fluid connection with the fluid transport module, including a turbine, an adjustable nozzle such as an atomizer nozzle connected to the turbine, and in gas or air flow connection with the turbine.

In one embodiment, fluid exits the dispersion module under a pressure of approximately 100 psi and the sprayer emits droplets of the fluid having an average size of about 130 microns to a height of approximately 100 feet approximately vertically. One embodiment includes droplets having the larvicide VectoBac WDG.

Other features and aspects of the invention will become apparent by consideration of the following detailed description and accompanying drawings.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated are examples. It is understood that the invention is not limited to the precise arrangements and instrumentalities shown, wherein.

DETAILED DESCRIPTION OF THE INVENTION

Example embodiments will now be described more fully with reference to the accompanying drawings.

Figure 1:
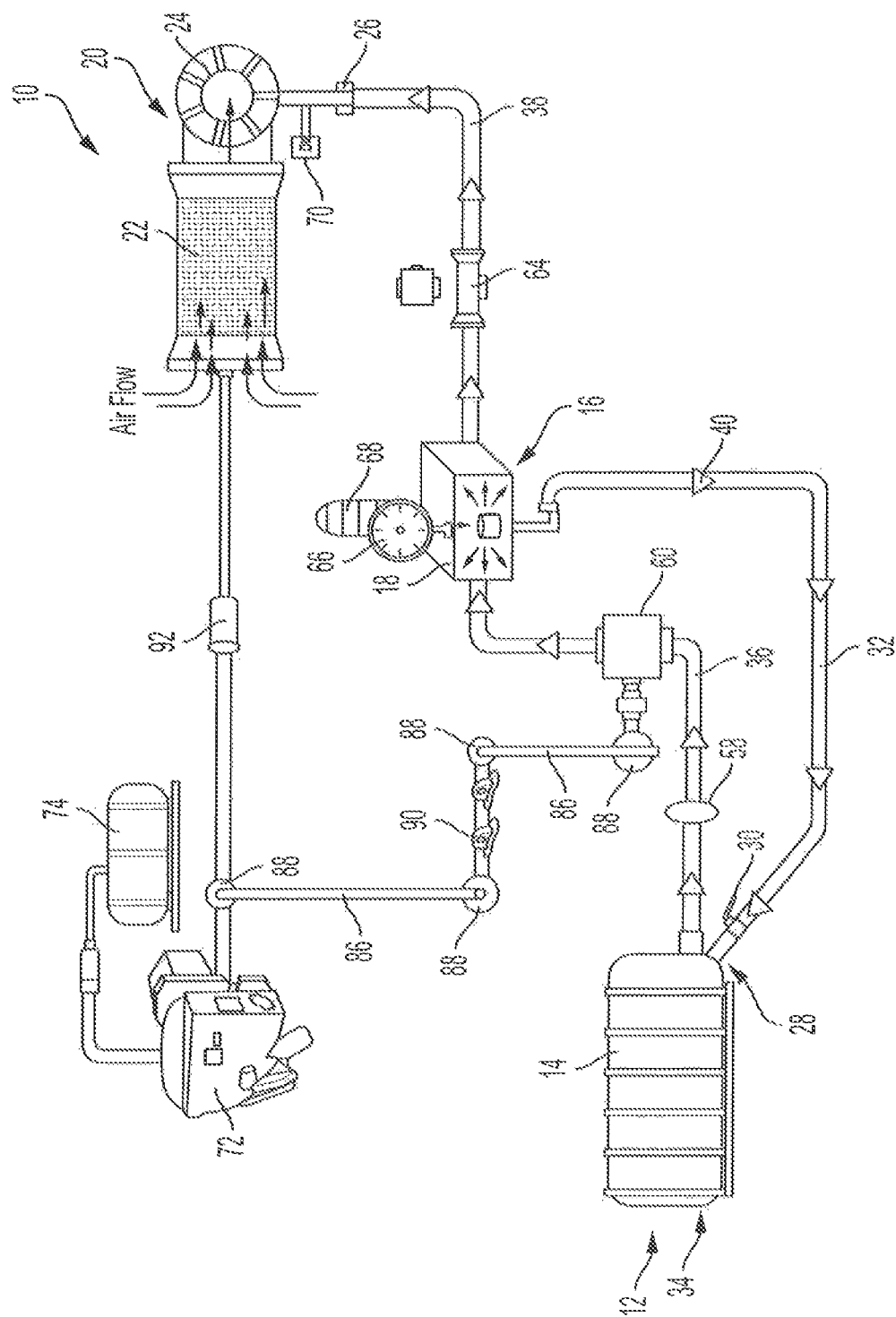
FIG. 1 is a schematic drawing of the invention.
Figure 2:
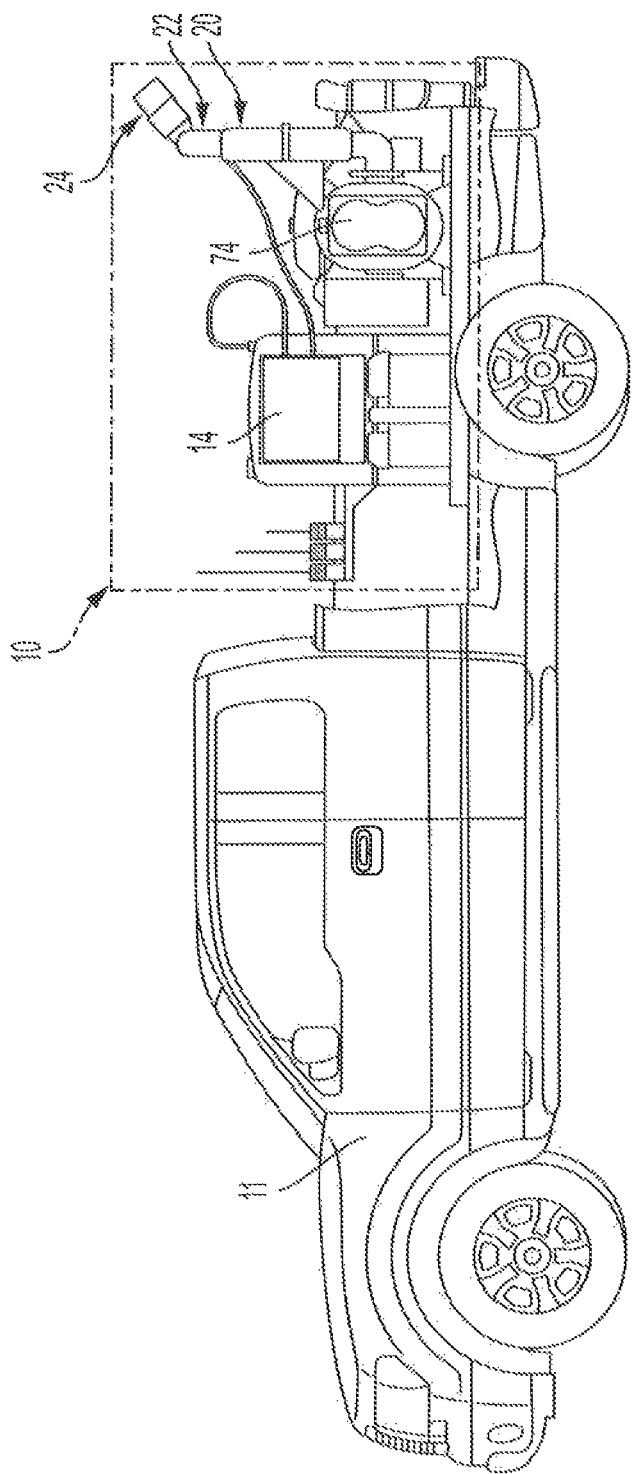
FIG. 2 is a side view of the invention located on a vehicle.
Figure 3:
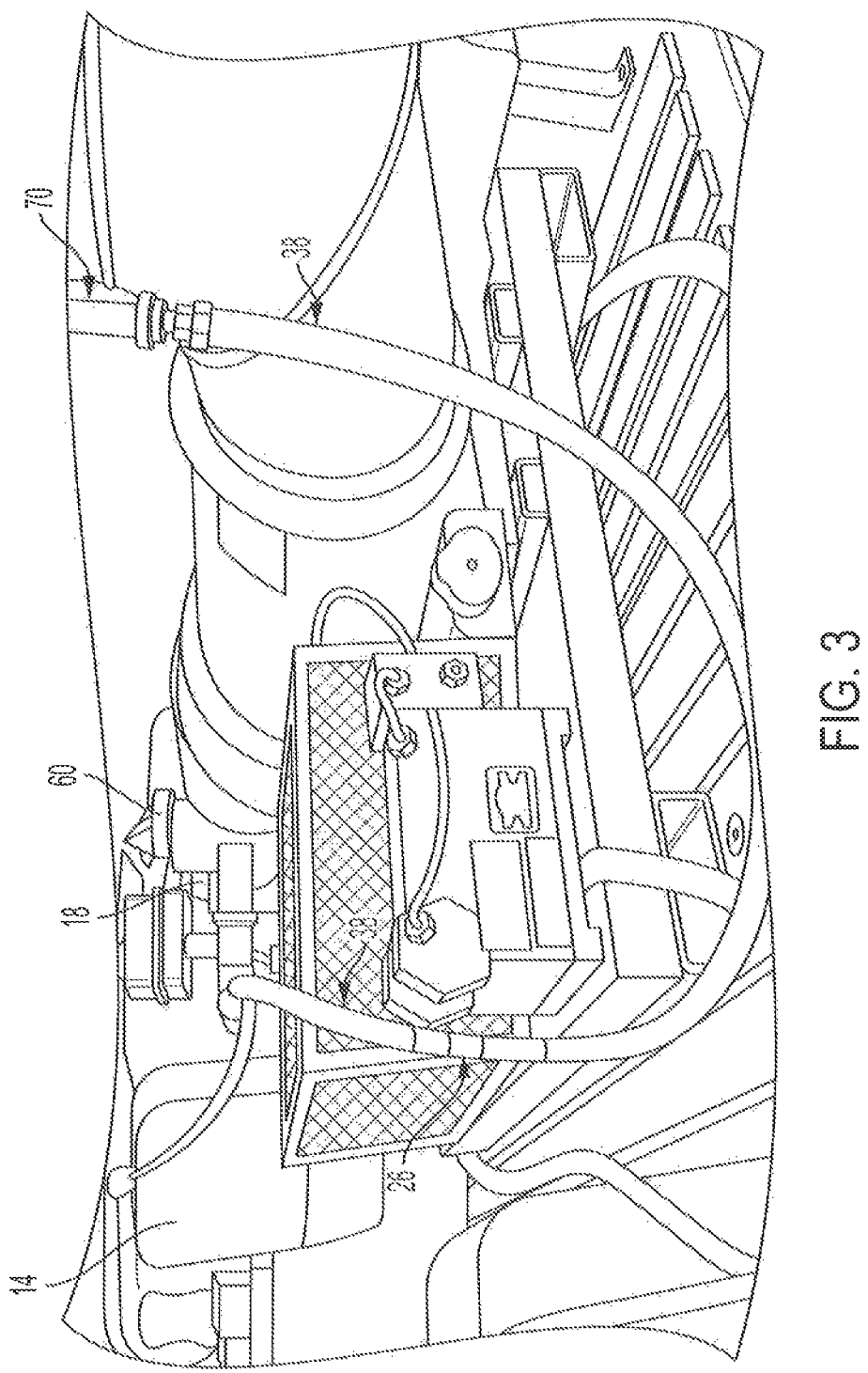
FIG. 3 is a detailed perspective view of the invention located on a vehicle.
Figure 4:
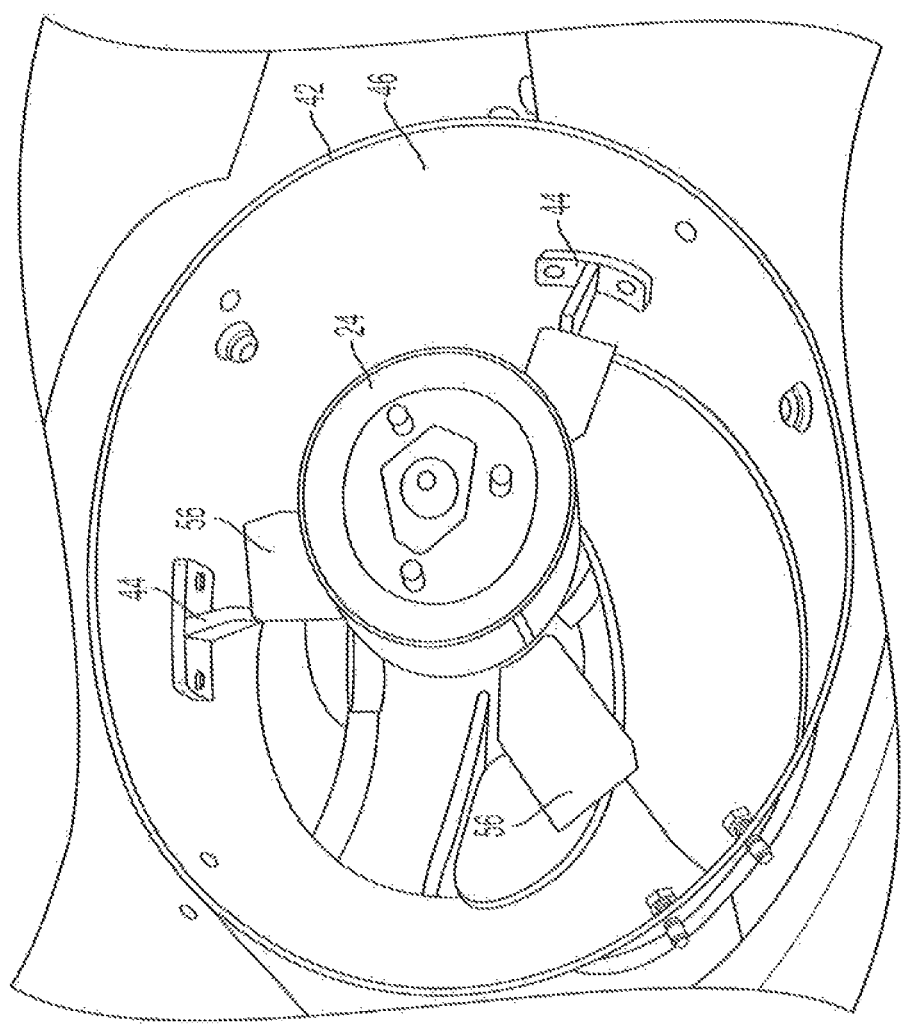
FIG. 4 is a top perspective view of a detail of the atomizer nozzle of the invention.
Figure 5:
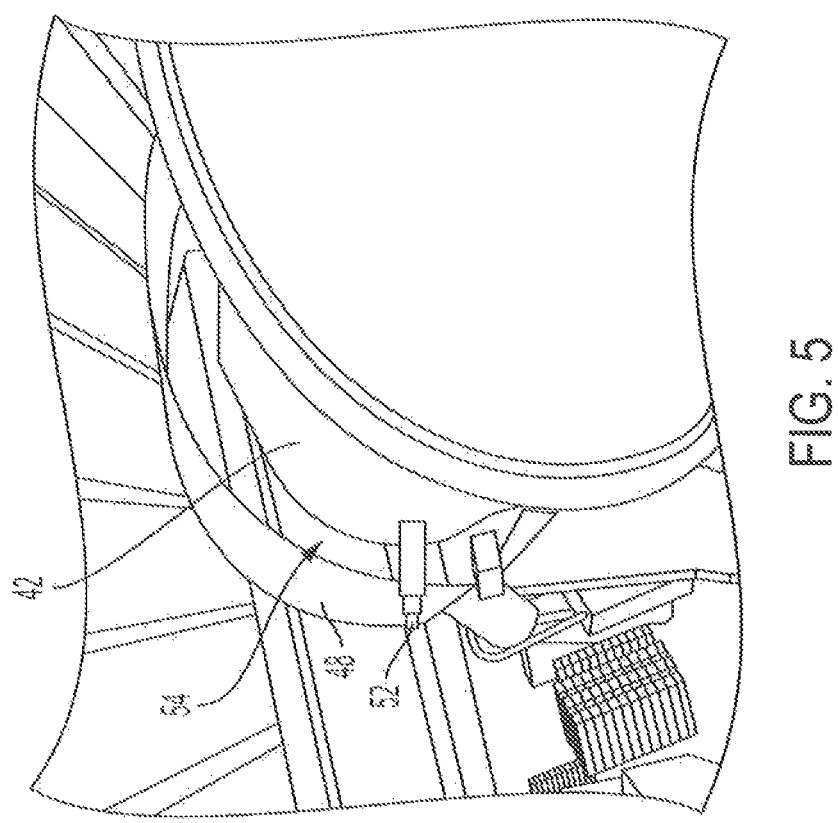
FIG. 5 is a detailed view of an embodiment of an atomizer nozzle of the invention.

Referring to the FIGS. 1 and 2, the apparatus of the present invention provides a portable sprayer for liquids and particulate-containing liquids, generally indicated by reference numeral 10. The apparatus 10 may be loaded on a vehicle 11 such as a truck, as shown in FIG. 2.

As shown in FIGS. 1 and 2, in one embodiment, the apparatus 10 includes a fluid storage module 12 having at least one fluid tank 14. A fluid transport module 16 is in fluid connection with the fluid storage module 12. The fluid transport module 16 includes a distribution block 18. A fluid dispersion module 20 is in fluid connection with the fluid transport module 16. The fluid dispersion module 20 includes a turbine 22 and a nozzle such as an atomizer nozzle 24 connected to the turbine 22. A flow restrictor 26 may be located in the fluid dispersion module 20 at a point before the atomizer nozzle 24 and after the distribution block 18. In addition, a pressure regulator may be located between the fluid tank 14 and the distribution block 18.

The atomizer nozzle 24 may alternatively or also be itself adjustable. Adjustment of the atomizer nozzle 24 may be made in the angle or size of the blades, or the fluid speed in the apparatus 10 or by other means. The atomizer nozzle 24 is in fluid connection with the fluid transport module 16 and is in gas or air flow connection with the turbine 22.

In one embodiment of this invention, the fluid tank 14 comprises a fluid tank apparatus 28. The tank may be a large fluid tank 14 such as a 100 gallon supply tank. Some prior art systems include a shut off valve between the fluid tank 14 and the rest of the fluid dispersion module 20. In another embodiment of this invention, the shut off valve 30 that may usually be in a sprayer in this location (illustrated in FIG. 1) is removed or does not exist in the apparatus 10. A remote shut off valve 30 is installed at the rear of the vehicle 11. The repositioning of a shut off valve makes draining and flushing of the apparatus 10 easier for a user, and helps prevent a situation where a turbine may be run dry or pumps in the fluid dispersion module 18 might be burned out.

The fluid tank 14 apparatus includes a return extension line 32 which extends to the interior of the tank. One embodiment of the return extension line 32 is shown in FIG. 1 showing a fluid return from the distribution block 18 to the fluid tank 14. However, the return extension line 32 may be located in other areas of the fluid dispersion module 20 and be connected to the fluid tank 14. The inclusion of the return extension line 32 to a lower portion 34 of the fluid tank 14 reduces aeration, splashing, and excessive foam in fluid contained in the fluid tank 14.

In addition, the fluid dispersion module 20 may include a first product line 36 from the fluid tank 14 to the distribution block 18 and a second product line 38 from the distribution block 18 to the atomizer nozzle 24. A second product line 38 would lessen the chance of hammer effects within the line while the apparatus 10 is in use.

The turbine 22 may be a CSM3 Sprayer Duster such as one manufactured by Buffalo Turbine, or an equivalent.

The apparatus 10 may further include a fluid 40 flowing through the fluid storage module 12, the fluid transport module 16 and the fluid dispersion module 20, wherein the fluid 40 flows through the apparatus 10 and exits the fluid dispersion module 20 under pressure. For example, the fluid 40 may flow through the atomizer nozzle 24 at approximately 100 psi. Under that pressure, the apparatus 10 may emit droplets in any direction, via the atomizer nozzle 24, which is powered by the turbine 22. The direction of the emission of the droplets may be adjustable. Also, the size of the droplets may be adjustable. In one embodiment, the droplets are emitted approximately vertically to a height of approximately 100 feet and the droplets have an average size of about 130 microns. The droplets may be formed in a range of about 80 to 190 microns in diameter.

The fluid 40 may be water and the droplets may contain particulates suspended in the water. The particulates may be larvicide. For example, the larvicide may be VectoBac WDG biological larvicide in water dispersible granules. The larvicide may be any granules containing *Bacillus thuringiensis*, subsp. *israelensis*, strain AM 65-52 or equivalent larvicide.

In one embodiment, the fluid 40 comprises a composition having approximately 1 pound of water dispersible granule larvicide to approximately 1 gallon of water. This composition may be mixed in a separate mixing procedure and may be created in a separate mixing module before being placed in the fluid storage module 12.

In one embodiment, a turbine 22 of the type and configuration as shown in FIGS. 3 through 8 is provided:

A Buffalo™ turbine CSM3 sprayer, Model #BT-D1003M, or equivalent, may be used. The Model #BT-D1003M comprises four No. 6502, 65° flat fan nozzles. To provide adequate dispersion, as shown in FIG. 4 through FIG. 8, the turbine 22 may include a turbine ring 42, one or more atomizer nozzle mounting brackets 44 fitted onto an inside surface 46 of the turbine ring 42. The atomizer nozzle 24 that is provided with the Model #BT-D1003M may be used or replaced with a Micronair AU5000 rotary atomizer or the equivalent when used for dipersing larvicide such as VectoBac® Water Dispersible Granules (WDG) Biological Larvicide in a water solution.

Figure 6:
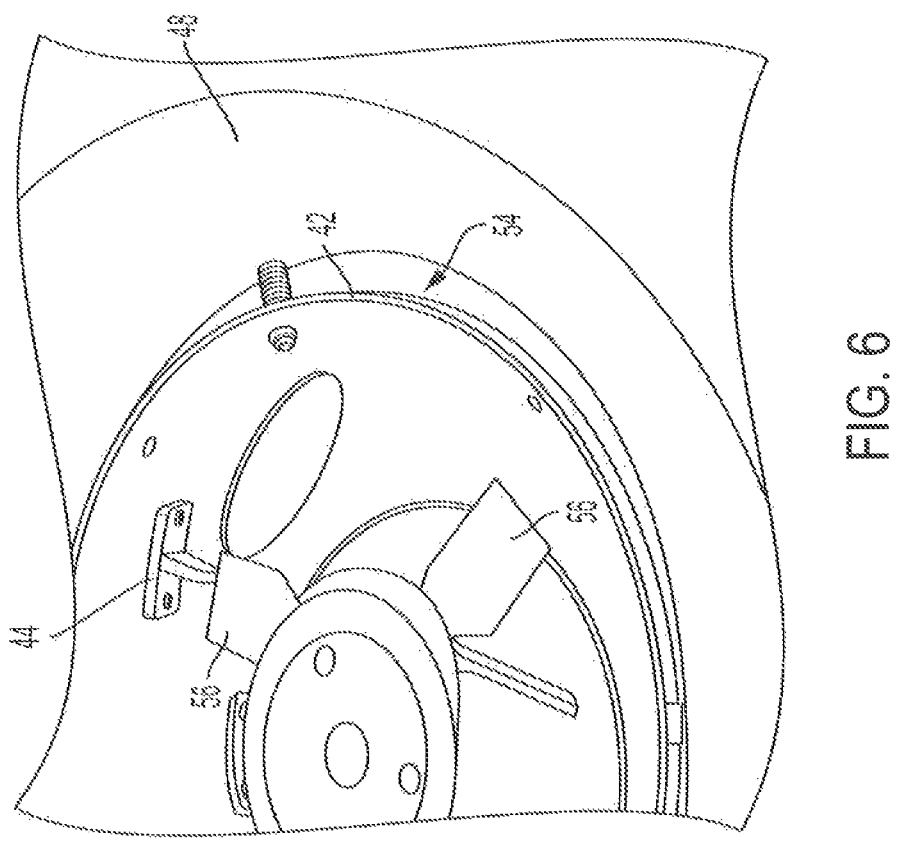
FIG. 6 is an end view of a detail of an atomizer nozzle of the invention.
Figure 6A:
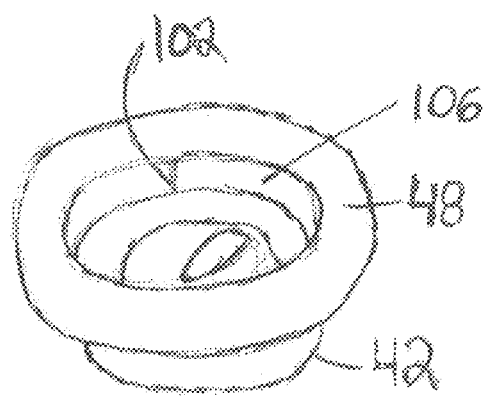
FIG. 6A is a perspective view of a detail of a turbine of the invention.
Figure 6B:
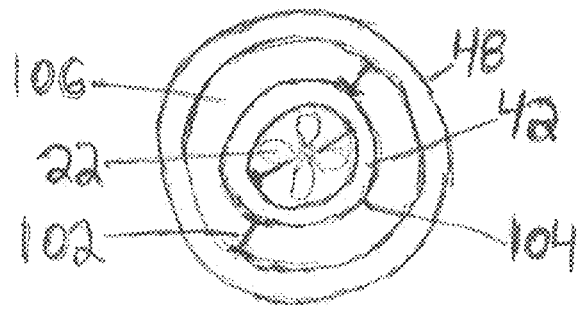
FIG. 6B is a top view of a detail of a turbine of the invention.
Figure 6C:
FIG. 6C is a side view of a detail of a turbine of the invention.
Figure 7:
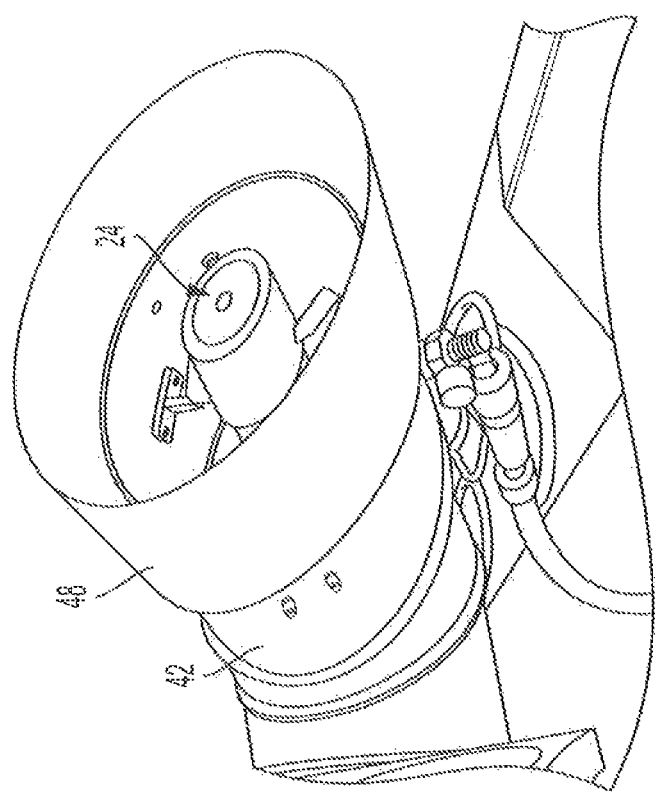
FIG. 7 is a perspective view of the turbine of the invention.
Figure 8:
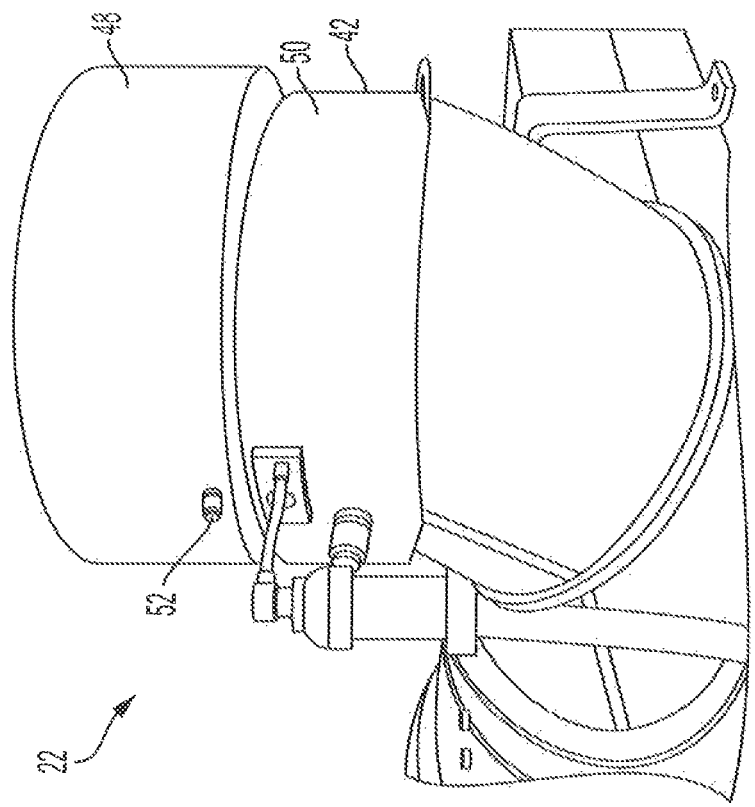
FIG. 8 is a perspective view of the turbine of the invention.

In addition, as shown in FIG. 5 through FIG. 8, the atomizer nozzle 24 may comprise an external exit ring 48. The external exit ring 48 may be attached to an outer surface 50 of the turbine ring 42 with an external exit ring mounting bracket 52, alternatively the external exit ring 48 may be intrinsic with the atomizer nozzle 24. One or more spaces 54 between the outer surface 50 of the turbine ring 42 and the external exit ring 48 may be provided to create or enhance a vacuum effect within the space 54, which is created by the outflow of the atomizer nozzle 24. Thus, when there is a flow of fluid 40 in a spray column, the space 54 helps reduce turbulence of the outflow of the atomizer nozzle 24 and reduce the amount of fluid 40 wasted near the outer surface 50 of the turbine ring 42. One embodiment of the invention is detailed in FIGS. 6A through 6C. The turbine ring 42 is located around a perimeter of the turbine 22. An external exit ring 48 is located around a perimeter of the turbine ring 42 extending perpendicularly from the turbine ring 42 away from the turbine 22. one or more external exit ring spacing brackets 102 connect the turbine ring 42 to the external exit ring 48, so that at least a portion of the external exit ring 48 overlaps an outer surface 104 of the turbine ring. In this embodiment, one or more voids 106 are formed between the turbine ring 42 and the external exit ring 48.

The apparatus 10, having the turbine 22 and atomizer nozzle 24 in the configuration described above, may be configured to create a stream of air at a speed of approximately 90 mph. Given this air volume and speed in this configuration, a larvicide solution, as described herein, exiting the fluid transportation module 16 becomes suspended and may be sprayed approximately 80-100 feet vertically. A larvicide solution sprayed at this height may be carried by the wind onto a target swath of approximately 450 ft. horizontally from the vehicle 11 with minimal deposition onto non-target areas.

In addition, the atomizer nozzle 24 may be adjusted as described herein. A Micronair atomizer may be configured with two or more adjustable blades as shown in FIG. 3 through FIG. 8. As shown, three 2.75-inch EX6353 adjustable blades 56 provide the ability to adjust the blade angle orientation. The blade angle may be adjusted to approximately between 30° and 55°, thus adjusting the rotational speed of the atomizer within the atomizer nozzle 24 from 2,000 to 10,000 revolutions per minute (rpm). A higher degree blade angle on the atomizer provides a lower rotational speed. For the apparatus 10 a higher rpm results in a smaller average Volume Mean Diameter (VMD) for droplets of fluid dispersed. Consequently, droplet size and flowrate can be adjusted independently by modifying the angle of the blades and using a flow restrictor 26 which can be at a proper restrictor size or adjustable to a desired restriction. An adjustable flow restrictor such as a Variable Restrictor Unit (VRU), provided with the Micronair atomizer, may be used.

In another embodiment, the flow restrictor 26 may be connected between the second product line 38 and the atomizer nozzle 24 to help accurately control the volume of the fluid 40 dispersed.

For the configuration of the blade angle described herein, and for proper dispersal, VMDs may be created to be approximately between 123 and 139 μm. Flowrates of 2 and 3 gallons per minute (gpm) allow a vehicle 11 to have a speed up to 10 mph over a swath of up to 450 feet, which is greater than that available in the present art. For a 10 mph vehicle 11 speed, the optimal blade angle for the desired rpms to achieve adequate droplet size in the configuration described herein is approximately 35 degrees, providing an average VMD of 131 microns. The optimal diameter of the flow restrictor 26 for this resulting VMD on the Micronair atomizer VRU is No. 44, or a diameter of about 0.086".

The fluid transport module 16 may further include means for reducing 58 cavitation, coagulation and/or agglomeration such as a mesh filter. The means for reducing 58 cavitation, coagulation and/or agglomeration is in fluid connection with the fluid storage module 12 and at least one pump 60. The pump 60 is also in fluid connection with the distribution block 18. Further, the distribution block 18 is in fluid connection with the fluid dispersion module 20.

Figure 9:
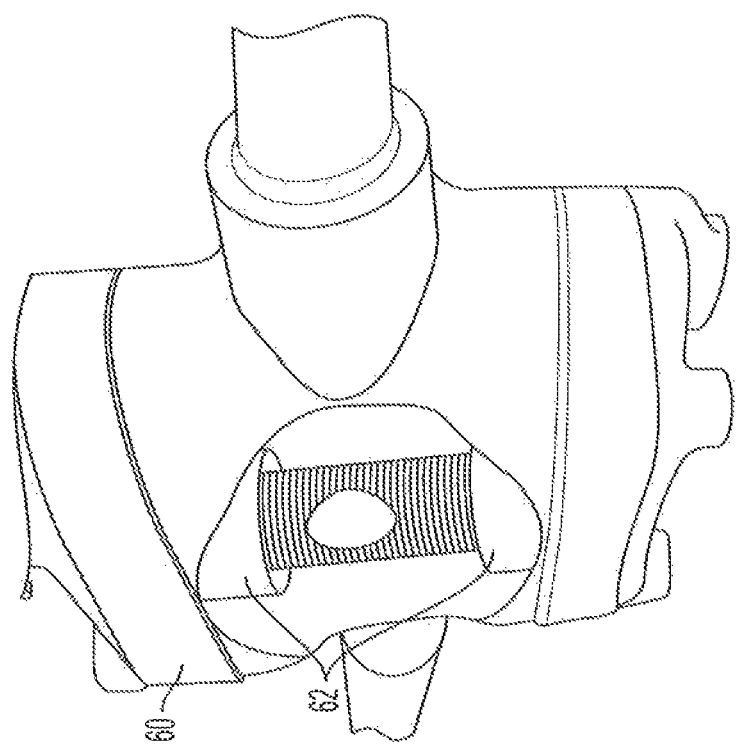
FIG. 9 is a perspective view of a pump of the invention.
Figure 10:
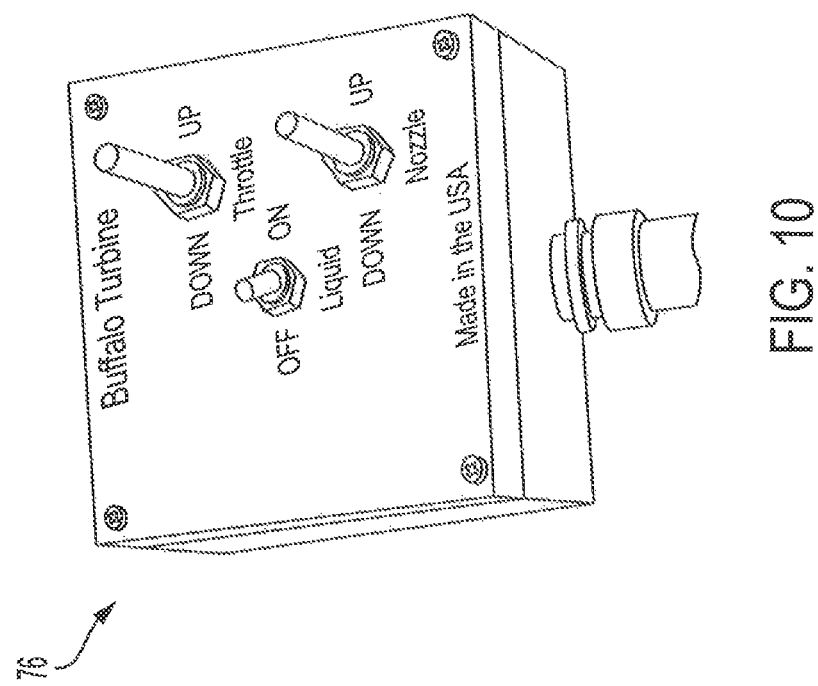
FIG. 10 is a detailed view of a remote control of the invention.
Figure 11:
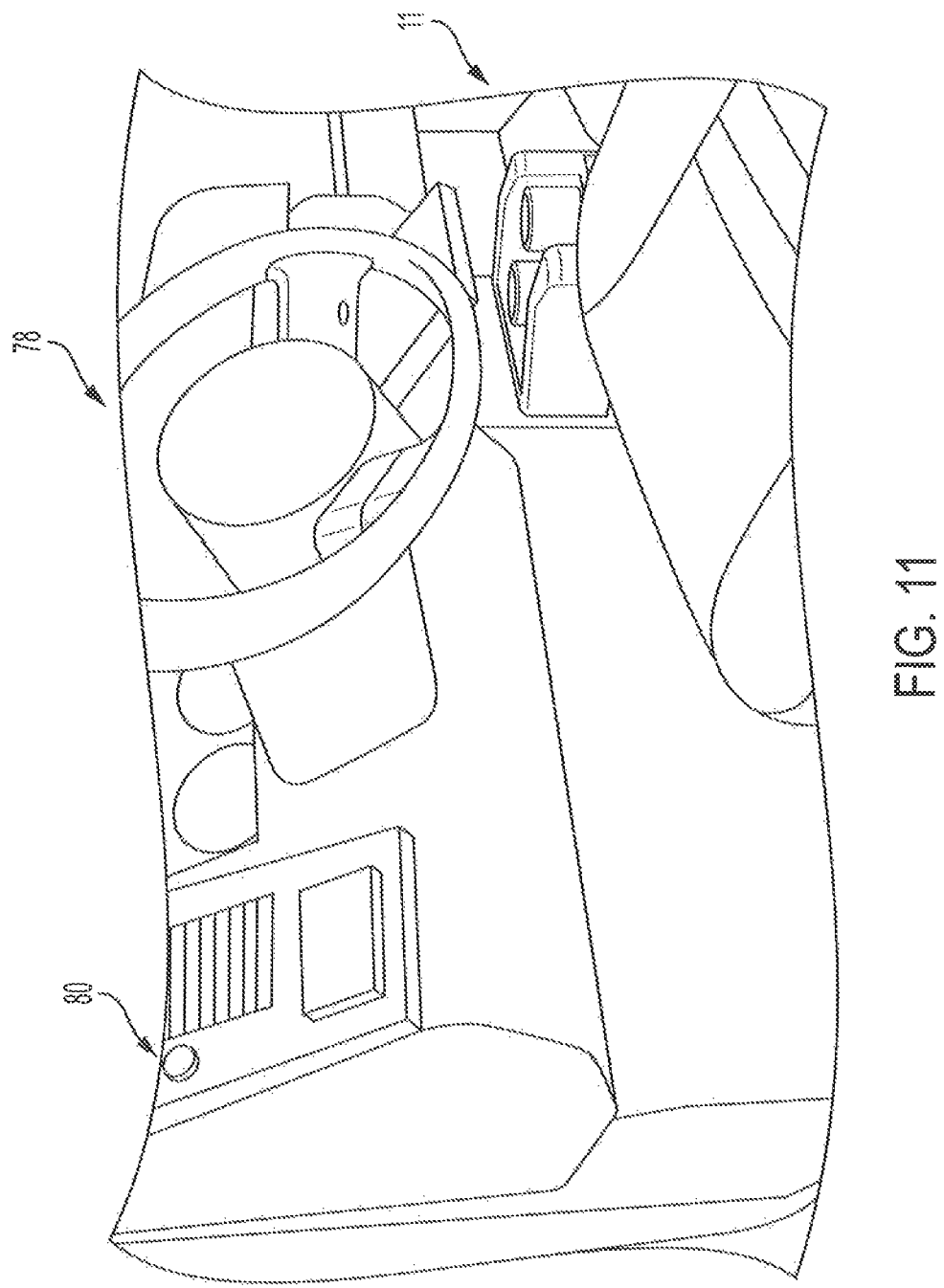
FIG. 11 is a detailed view of a cab of a vehicle incorporating the invention.
Figure 12:
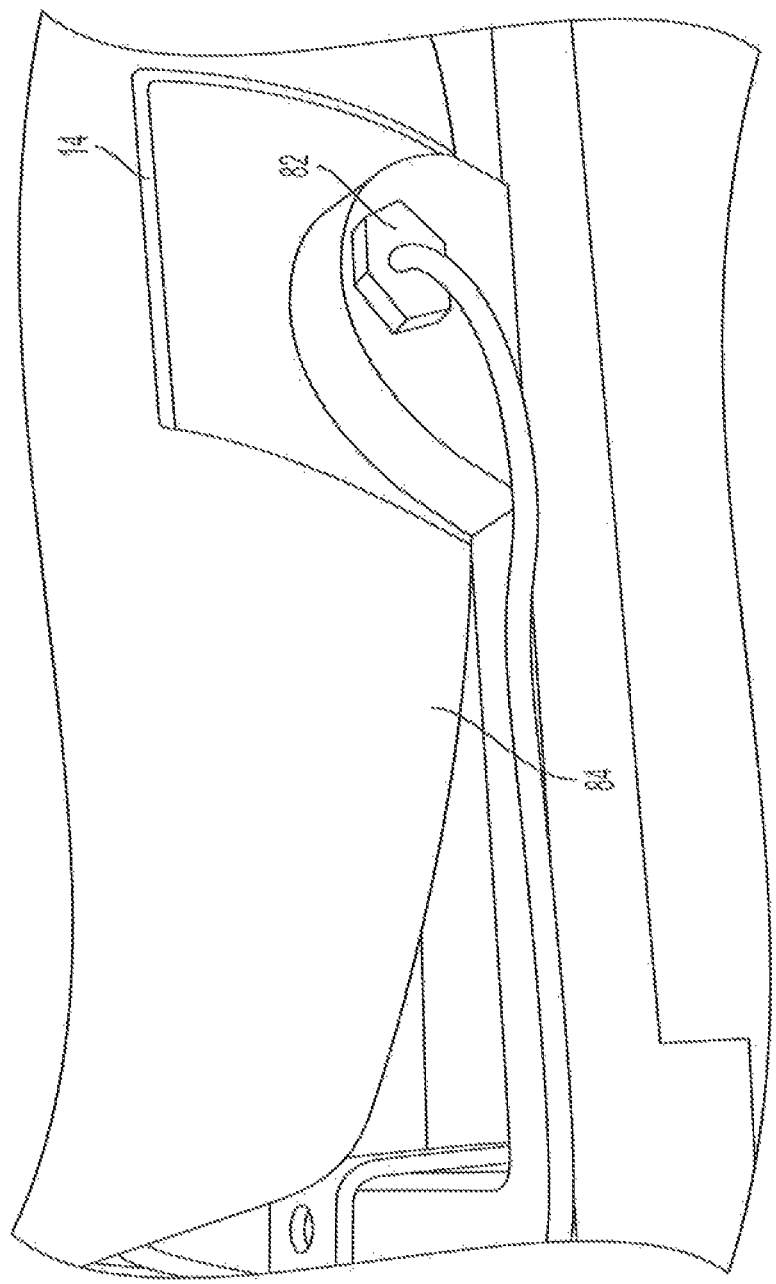
FIG. 12 is a detailed view of a fluid tank of the invention.
Figure 13:
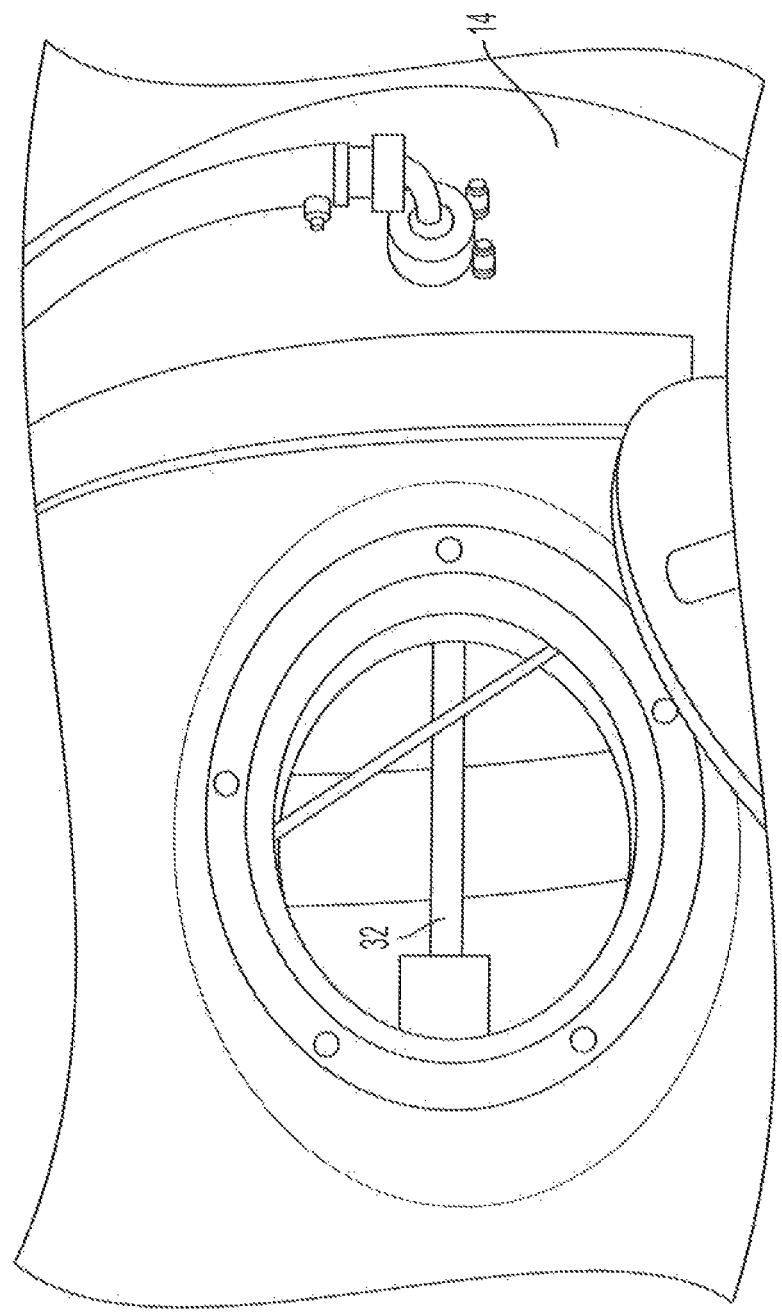
FIG. 13 is a top detailed view of a fluid tank of the invention.

Since fluid containing larvicide is abrasive, it often wears out piston seals made of plastic or leather on pumps 60. In another embodiment of the invention, piston seals 62 made of fabric or an equivalent abrasion resistant material are used as shown in FIG. 9.

In another embodiment, a larvicide composition is made which, when used with the apparatus 10, allows for the use of less larvicide and the provision of a more efficient and better directed application of the larvicide. The composition may include a mixture formed of 1 pound of water dispersible granule larvicide dispersed in 1 gallon of water, wherein the mixture is formed into droplets approximately 130 microns in diameter. The droplets may range from about 80 to 190 microns in diameter.

As shown in FIG. 1, the apparatus 10 may include a valve 64 such as a ball valve for controlling fluid flow from the fluid transport module 16 to the fluid dispersion module 20.

To assist in monitoring and controlling the flow of fluid 40, the apparatus 10 may also include one or more pressure gauges 66, pulse dampeners 68 and/or flow meters 70, as shown in FIG. 1. However, the pressure gauges 66 or pulse dampeners 68 may also be made located elsewhere in the apparatus 10.

The apparatus 10 may include a power source 72 such as an engine or battery. For example, a 100 Amp battery may be used to provide sufficient electrical power for the apparatus 10. Where a small battery such as a 100 amp battery is used, a vehicle engine used with the battery may deliver too much power and burn out the battery. Thus, a smaller motor located on the vehicle may be used to provide charge to the battery of the apparatus 10 when it is running during spray operations.

A motor used for a power source 72 used to provide the charge to the apparatus 10 may be connected to a local fuel supply 74, such as a fuel tank. The motor used for a power source 72 may be located on the vehicle 11 transporting the apparatus 10 or it may be the engine of the vehicle 11 itself.

In addition, a remote control box 76 may be installed in the cab 78 of the vehicle 11. The remote control box 76 may regulate the direction of the atomizer nozzle 24, the flow of fluid 40, the function of the atomizer nozzle 24, or other elements to the apparatus 10. In addition, a warning indicator 80 may be added to the cab 78 of the vehicle 11 to indicate that the level of the fluid 40 in the fluid tank 14 is low. For example a remote control box 76 or a sensor 82 connected to the warning indicator 80 may be placed at the lower end 84 of the fluid tank 14 which is activated when the volume of the fluid tank 14 is below a predetermined amount such as 10 gallons, as shown in FIG. 10 through FIG. 13. The warning indicator 80 may be a light, sound, vibration, or other means for warning to a user.

In addition, the apparatus 10 may include means for providing motive force for components such as the pump 60. Means for providing motive force include belts 86, riding pulleys 88 and bearings 90 such as pillow bearings, where the belts 86 are linked to the means for providing motive force, as show in FIG. 1. The means for providing motive force may also be coupled to the turbine 22 to power the turbine 22 by means such as an engine coupling 92.

In an alternative embodiment, the fuel supply 74 for the power source 72 is an external fuel supply 74 and is located on a vehicle 11. The external fuel supply 74 is connected to a pump 60 such as a 12 volt low pressure lift pump also located on the vehicle 11. The lift pump may be dedicated to feed the power source 72 and replace the pump 60 which would otherwise come with the power source 72, which is not powerful enough to power the desired spray of fluid 40.

Figure 14:
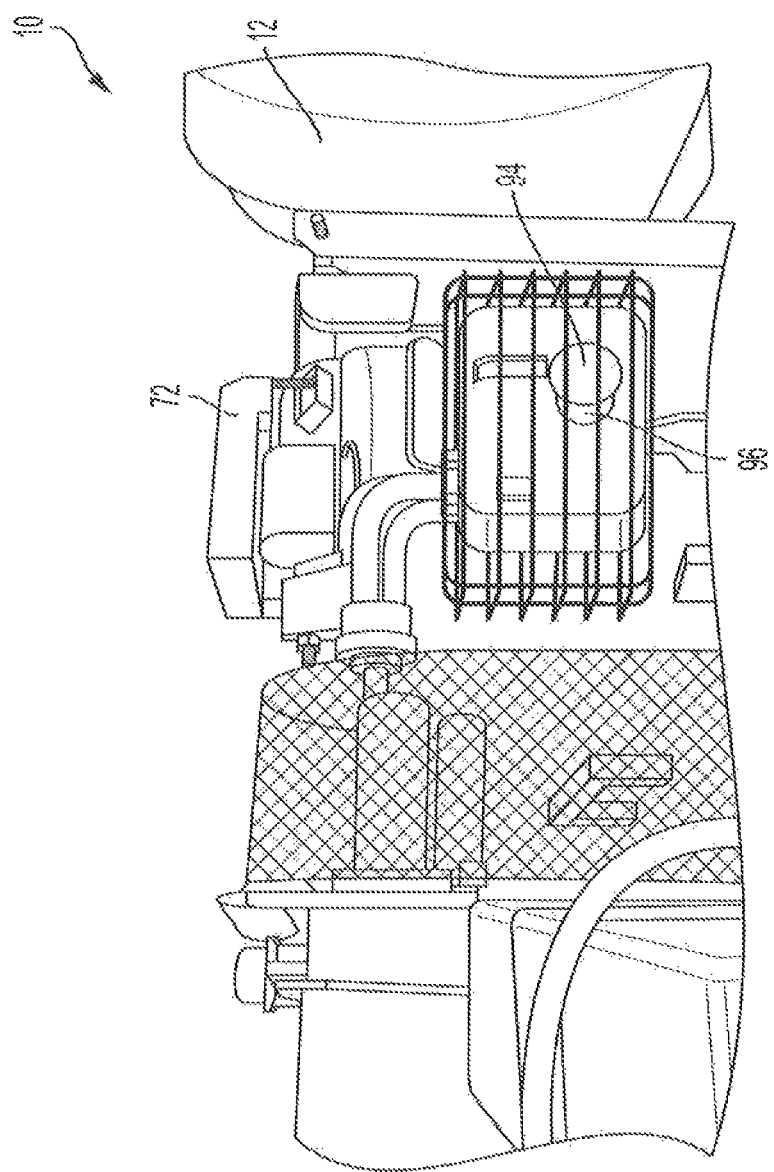
FIG. 14 is a detailed view of the invention configured for a vehicle.
Figure 15:
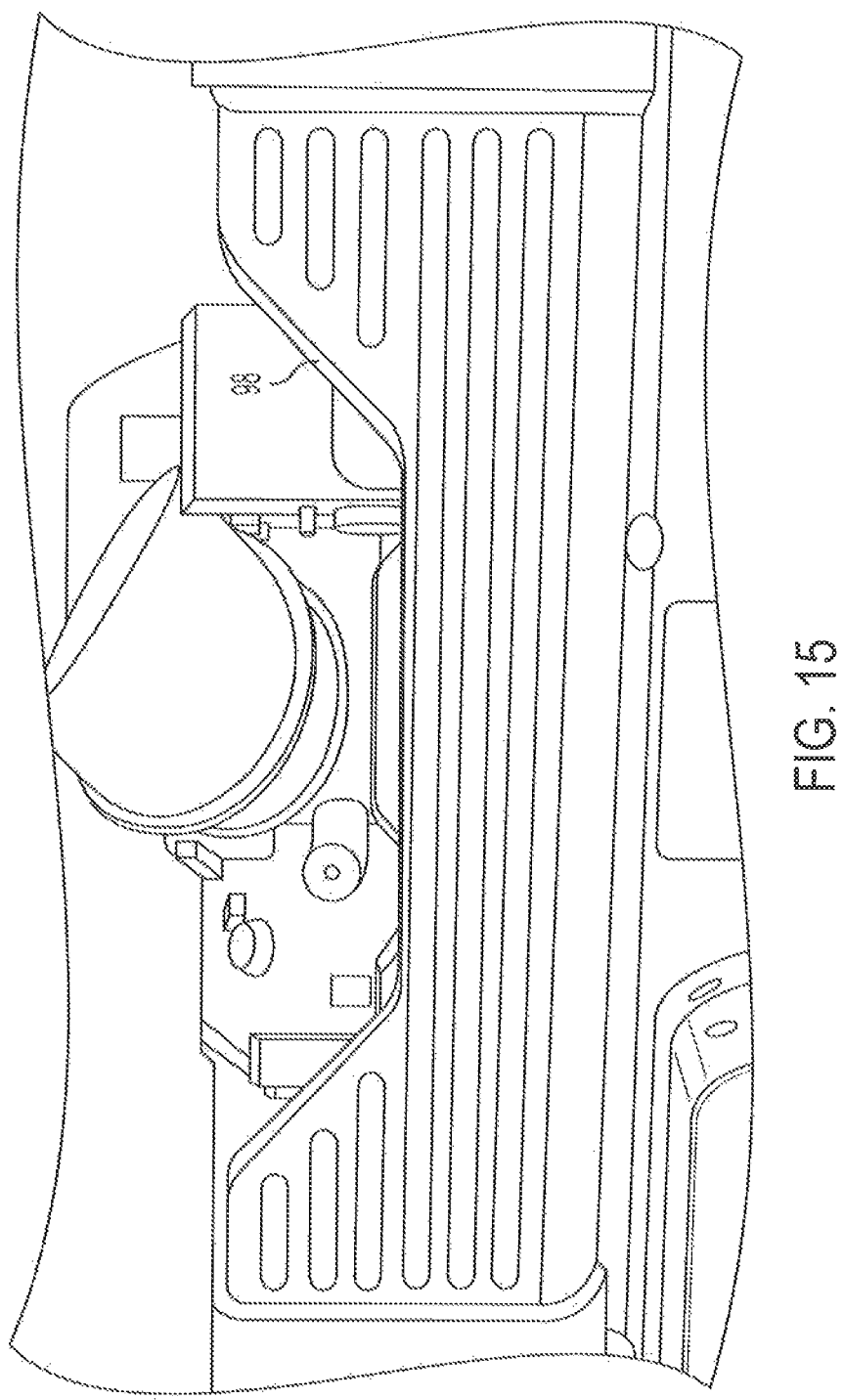
FIG. 15 is a detailed view of the invention configured for a vehicle.

In another embodiment, an exhaust diverter plate 94 is attached to the power source 72 in the path of the exhaust port 96 of the power source 72 as shown in FIG. 14. The exhaust diverter plate 94 is positioned to redirect heat and exhaust up and away from a vehicle platform for the apparatus 10 or people that may otherwise be affected by the heat and exhaust fumes. In another embodiment a vehicle 11 serving as a platform for the apparatus 10 includes a tailgate having an aperture or a depression 98, as shown in FIG. 15.

The foregoing description of the embodiments of this invention has been provided for purposes of illustration and description. The description is not intended to be exhaustive or to limit the disclosure of the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable sprayer for one of liquids and particulate-containing liquids, comprising:
   a. a fluid storage module having at least one fluid tank;
   b. a fluid transport module in fluid connection with the fluid storage module, including
      i. a distribution block; and
   c. a fluid dispersion module in fluid connection with the fluid transport module, including
      i. a turbine;
      ii. an atomizer nozzle having an outer surface connected to the turbine; and in fluid connection with a fluid transport module and in gas flow connection with the turbine;
      iii. a turbine ring located around a perimeter of the turbine;
      iv. an external exit ring located around a perimeter of the turbine ring extending perpendicularly from the turbine ring away from the turbine, wherein at least a portion of the external exit ring overlaps an outer surface of the turbine ring;

v. one or more external exit ring spacing brackets connecting the turbine ring to the external exit ring; and v. one or more voids between the turbine ring and the external exit ring.

2. The sprayer of claim 1, further including a fluid flowing through the fluid storage module, the fluid transport module and the dispersion module, wherein the fluid exits the dispersion module under a pressure of approximately 100 psi.

3. The sprayer of claim 2, wherein the apparatus emits droplets of the fluid having an average size of about 130 microns to a height of approximately 100 feet approximately vertically.

4. The sprayer of claim 2, wherein the fluid comprises particulates suspended in water.

5. The sprayer of claim 3, wherein which the droplets are in a range of about 80 to 190 microns in size.

6. The sprayer of claim 4, wherein the particulates further comprise a pesticide.

7. The sprayer of claim 6, wherein the pesticide is a larvicide.

8. The sprayer of claim 7, wherein the particulates further comprise *Bacillus thuringiensis*, subsp. *israelensis*, strain AM 65-52.

9. The sprayer of claim 2, wherein the fluid comprises approximately 1 pound of water dispersible granule larvicide to approximately 1 gallon of water.

10. The sprayer of claim 1, wherein the fluid transport module further comprises:

a. means for reducing at least one of cavitation, coagulation and agglomeration in fluid connection with the fluid storage module and at least one pump;

b. said at least one pump in fluid connection with the means for reducing at least one of cavitation, coagulation and agglomeration and the distribution block; and c. the distribution block in fluid connection with the fluid dispersion module.

11. The sprayer of claim 10, wherein the means for reducing at least one of cavitation, coagulation and agglomeration comprises a mesh filter.

12. The composition of claim 10, wherein the droplets range from about 80 to 190 microns in diameter.

13. A fluid dispersion module for a sprayer for one of liquids and particulate-containing liquids, including:

i. a turbine;

ii. a turbine ring located around a perimeter of the turbine;

iii. an external exit ring located around a perimeter of the turbine ring extending perpendicularly from the turbine ring away from the turbine, wherein at least a portion of the external exit ring overlaps an outer surface of the turbine ring, iv. one or more external exit ring spacing brackets connecting the turbine ring to the external exit ring, and v. one or more voids between the turbine ring and the external exit ring, and vi. an atomizer nozzle having an outer surface connected to the turbine, and in fluid connection with a fluid transport module and in gas flow connection with the turbine.

14. The fluid dispersion module of claim 13, wherein a distal end of the external exit ring extends past a distal end of the turbine.

* * * * *